United States Patent Office 3,610,068
Patented Oct. 5, 1971

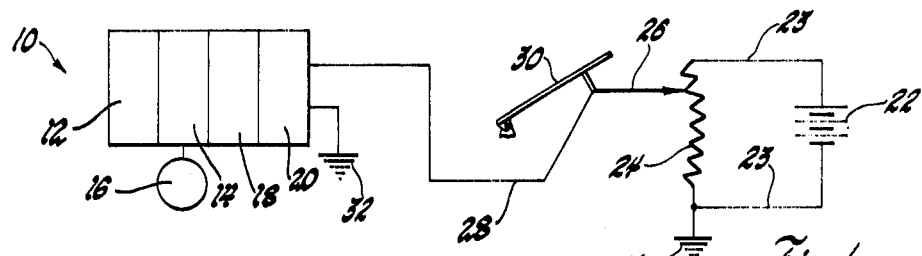
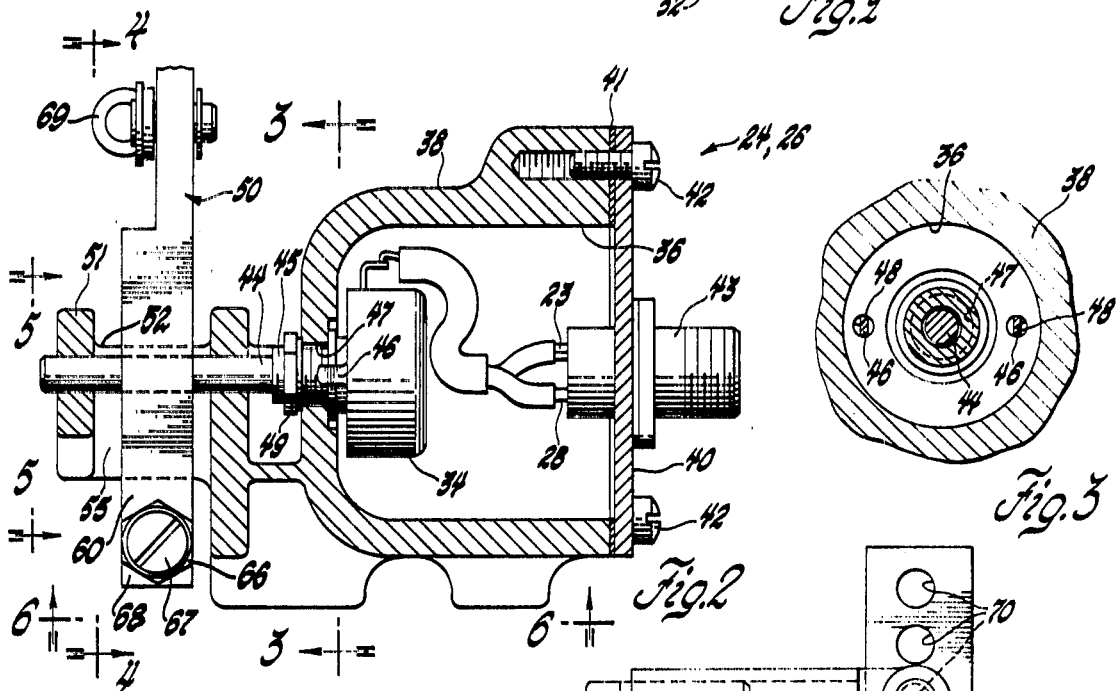
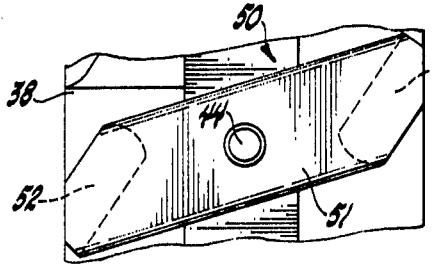
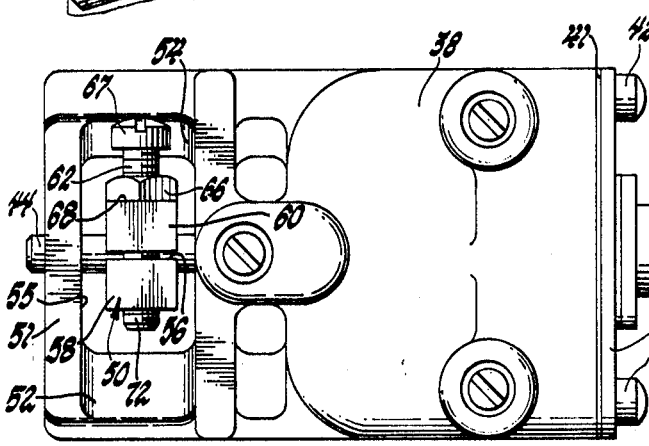

3,610,068
CONTROL SYSTEM
Robert H. Schaefer, Westfield, and Clifford H. Fleetwood, Beech Grove, Ind., assignors to General Motors Corporation, Detroit, Mich.
Filed Nov. 17, 1969, Ser. No. 877,157
Int. Cl. G05g 5/04, 5/16
U.S. Cl. 74—526
8 Claims

ABSTRACT OF THE DISCLOSURE

A control system including improved means for protecting, mounting and adjusting a control mechanism, including a housing for a specific control device, a shaft extending from the control device through the housing, a lever mounted on the shaft exterior of the housing, a boss formed on an outside surface of the housing, and a bolt and nut arrangement mounted on the lever, the bolt being in contact with the boss when the lever and shaft are in predetermined rotary positions, and the nut serving to secure the lever on the shaft and fix the rotary positions of the shaft relative to the boss.

---

This invention relates to control systems, such as motor vehicle transmission control systems, and more particularly to a control system including improved means for mounting, protecting and adjusting the mechanism which produces an electric signal reflective of carburetor throttle valve position.

In automatic transmissions of the plural ratio type, shifts take place at certain points determined by vehicle speed and driver demand. Hence, if the driver initiates a sudden acceleration, the shift point will occur differently than would the case if the acceleration were gradual. One way of indicating driver demand is to utilize a linkage for connecting the accelerator pedal to a pressure regulating valve. The position of the accelerator pedal is thus sensed by the pressure regulating valve and a regulated pressure is developed reflecting the position. In a way well known to those skilled in the art, this regulated pressure is utilized in the transmission control system for altering shift points, such as by opposing upshifting movements of a shift valve. Various means have been proposed for transferring driver demands to the transmission. Specifically, electro-hydraulic arrangements have been used, whereby driver demands, as applied to the accelerator pedal, are converted first to an electrical effect, and thereafter to a corresponding fluid pressure. An example of an arrangement for electrically controlling a fluid pressure regulator may be found in U.S. Pat. No. 3,225,619, issued in the name of R. H. Schaefer on Dec. 28, 1965.

An object of the invention is to provide improved means for mounting, protecting and adjusting a control mechanism, such as the mechanism which produces an electric signal reflective of carburetor throttle valve position.

Another object of the invention is to provide a control system which is efficient, moisture-resistant and not easily damaged before or after installation, even when subjected to impact while mounted on exposed surfaces.

A further object of the invention is to provide a control system assembly including a housing for a potentiometer, an adjustably mounted lever associated with the exposed shaft thereof, and improved threaded means for both securing the lever on the potentiometer shaft and providing adjustment of the lever and shaft relative to a stop formed on said housing.

These and other objects and advantages of the invention wil become more apparent when reference is made to the following specification and accompanying drawings, wherein:

FIG. 1 is a schematic view of a transmission control system embodying the invention;

FIG. 2 is an enlarged cross-sectional view of a component represented schematically in FIG. 1, and embodying the invention;

FIG. 3 is a cross-sectional view taken along the plane of line 3—3 of FIG. 2, as if FIG. 2 were a full round view, and looking in the direction of the arrows;

FIG. 4 is a cross-sectional view taken along the plane of line 4—4 of FIG. 2, as if FIG. 2 were a full round view, and looking in the direction of the arrows;

FIG. 5 is a fragmentary end view taken along the plane of line 5—5 of FIG. 2, as if FIG. 2 were a full round view, and looking in the direction of the arrows; and FIG. 6 is a bottom view taken along the plane of line 6—6 of FIG. 2, as if FIG. 2 were a full round view, and looking in the direction of the arrows.

Referring now to the drawings in greater detail, FIG. 1 illustrates schematically a transmission control system 10 including generally a transmission 12 which automatically changes from one drive ratio to another in accordance with the position of a suitable shift valve 14. The shift valve 14 is typically urged in the upshifting direction by an appropriate governor 16 and in the downshifting direction by an appropriate fluid pressure reflecting driver demand or torque demand on the engine. Driver demand may be developed by a pressure regulating valve train 18, such as that illustrated and described in the above-mentioned U.S. Pat. No. 3,225,619. The pressure developed by the pressure regulating valve train 18 may be varied between minimum and maximum extremes, in accordance with driver demand, by a solenoid-actuated control valve 20 whose solenoid winding is energized by a D.C. source, such as a vehicle battery 22.

A variable impedance means, such as a potentiometer arrangement, represented generally in FIG. 1 as 24, is connected across the battery 22 via lines 23 and has an adjustable tap means 26 extending via a line 28 to the solenoid-actuated control valve 20. Consequently, the position of the adjustable tap means 26 determines the proportion of the battery voltage applied to the solenoid winding. The adjustable tap means 26 is preferably moved directly by the accelerator pedal 30, which controls the conventional engine throttle valve (not shown). However, other means may be used to provide this movement, reflecting driver demand on the engine, such as a direct connection with the throttle valve linkage or by making use of intake manifold pressure.

In operation, when the accelerator pedal 30 is depressed such that the throttle opening is increased to reflect an increased torque demand, the adjustable potentiometer tap means 26 is moved toward ground 32. As a result, the proportion of battery voltage applied to the solenoid winding of the control valve 20 is decreased. Of course, the applied voltage increases when the accelerator pedal 30 is moved so as to decrease the throttle opening and to move the tap means 26 away from ground 32. The resultant voltage serves to alternately energize and deenergize the solenoid portion of the control valve 20 which, in turn, controls the pressure acting on the valve train 18 and, thence, the downshifting of the shift valve 14 to correspondingly change the drive ratio of the transmission 12, as described in the above-mentioned patent.

Referring now to FIG. 2, the potentiometer and tap arrangement, which is represented generally as 24 and 26 in FIG. 1, is seen to more specifically include a controlled device, such as a potentiometer 34, mounted in a central chamber 36 of a housing 38. An end cover 40 and gasket 41 are secured to the housing 38 by bolts 42. A suitable connector 43 is mounted in an opening in the cover 40 and permits the lead lines 23 and 28 from the potentiometer 34 to extend therethrough for connection with the battery 22 and the solenoid winding of the control valve 20, respectively. Ground 32 (FIG. 1) is effected through the housing 38.

A potentiometer shaft 44, an externally threaded, non-rotating sleeve member 45 surrounding the shaft 44, and a pair of oppositely disposed index tangs 46 (FIG. 3) extend through three aligned openings, i.e., a large central opening 47 and oppositely disposed smaller similar openings 48, formed in the housing 38. A nut 49 is threadedly mounted on the member 45 adjacent the outer surface of the housing 38. A lever 50 (FIGS. 2 and 4) is adjustably mounted on the shaft 44 in a manner of be described, such that the final assembly may be adapted as a suitable substitute for the elements 24 and 26 of FIG. 1 which correspond to the elements 76 and 78 of the above-mentioned Schaefer Pat. No. 3,225,619.

A box-like compartment 51 (FIGS. 5 and 6) is formed on the exterior of the housing 38 adjacent the openings 47 and 48, and spaced apart from the end of the member 45 and the nut 49. A pair of stop members or bosses 52 and 54 (FIGS. 4–6) are formed within the central opening 55 of the box-like compartment 51 on opposing sides thereof and, hence, on opposite sides of the potentiometer shaft 44. A parallel-sided space or slit 56, such as might be formed by a saw cut, extends along the lever 50 beyond an opening 57 for the shaft 44, forming a pair of lever arms 58 and 60. A bolt 62 is mounted through a large opening 63 and a threaded opening 64 formed in the lever arms 60 and 58, respectively, of the lever 50, transverse of the elongated space or slit 56. A nut 66 is located on the bolt 62 between the head 67 thereof and the adjacent side 68 of the lever arm 60. A linkage member 69 is pivotally connected in one of a plurality of suitable openings 70 formed adjacent the solid end of the lever 50 for completing the connection of the lever 50 to the accelerator pedal 30 (FIG. 1).

It is essential that a device of this type have a starting reference point for coordinating one end of the range of potentiometer 34 settings with closed throttle valve position. Now, to initially set "zero" or "closed throttle" valve position for the lever 50, the potentiometer shaft 44 is first rotated counterclockwise (FIG. 4) with finger force until its internal potentiometer stop (not shown) is engaged.

At this point, the lever 50 is loosely mounted on the potentiometer shaft 44 in the central opening 55 of the compartment 51. The loose lever 50 is then rotated around the shaft 44 to a predetermined angle, say 55 degrees, with respect to horizontal for "closed throttle" position, as illustrated in FIG. 4, but not in contact with the boss 54. With the nut 66 of the bolt 62 positioned away from the lever arm 60, the bolt 62 is inserted through the enlarged opening 63 formed in the arm 60 and threaded through the treaded opening 64 formed in the other lever arm 58, until the end 72 of the bolt 62 abut against the adjacent surface 74 of the boss 52. The nut 66 is then turned on the bolt 62 away from the head 67 thereof and toward the side 68 of the lever arm 60. Tightening the nut 66 against the arm 60 will move the latter toward the arm 58 by virtue of progressively closing the space 56 until the lever 50 is caused to be clamped in a fixed position on the potentiometer shaft 44, while simultaneously securing the bolt 62 in the threaded opening 64 of the lever 50 and, hence, in the closed throttle position of the lever 50 relative to the surface 74 of the boss 52. The lever 50 is now ready for connection with the accelerator pedal 30 in its closed throttle position via the linkage member 69, or may be connected directly to the throttle valve linkage (not shown).

It may be further noted in FIG. 4 that a counterclockwise rotation of some predetermined amount, say 70 degrees, from the position described above will move the lever 50 from its "closed throttle" position to "full throttle" position, wtihout contacting any part of the boss 52. This, of course, would cover the full potentiometer range illustrated by 24 in FIG. 1 and by 76 in the Schaefer patent.

If desired and/or more suitable for mounting purposes, the lever 50 may be mounted on the potentiometer shaft 44 180 degrees from the position just described. In the event, the same steps would be followed except that the end 72 of the bolt 62 would now abut against the surface 76 of the boss 54.

As may be noted in FIG. 2, the axial position of the potentiometer shaft 44 relative to the housing 38 is set by means of the nut 49 being threadedly tightened against the outer face of the housing 38.

From the foregoing, it should be apparent that the invention provides improved means for efficiently producing an electric signal which is reflective of carburetor throttle valve position and for assuring a moisture-resistant and damage-resistant control system.

It should be further apparent that the invention provides novel threaded means for securing a lever on a shaft, such as a potentiometer shaft, and for simultaneously providing an adjustable stop means therefor.

While but one embodiment of the invention has been shown and described, other modifications thereof are possible.

We claim:

1. A control system comprising a housing, an opening formed in said housing, a controlled device mounted in said housing, a rotatable shaft extending from said controlled device and through said opening, a lever mounted on said shaft exterior of said housing, a stop member formed on an outside surface of said housing, and single bolt and nut means mounted on said lever apart from said shaft and adaptable for contacting said stop member when said lever is in one of a plurality of rotary positions on said shaft and for securing said positioned lever on said shaft when said shaft is in one of a plurality of rotary positions relative to said controlled device, said lever and said shaft being readjustable to other respective rotary positions when desired.

2. The control system described in claim 1, and a first opening formed in said lever intermediate the ends thereof for receiving said shaft; a longitudinal slit formed in said lever and extending from one end thereof to said first opening therein forming a pair of parallel arms; and said single bolt and nut means includes a second opening through one of said pair of parallel arms transverse to said first opening, a threaded opening through the other of said pair of parallel arms aligned with said second opening, a bolt extending through said second opening and threadedly mounted through said threaded opening for contacting said stop member when said shaft and said lever are located in predetermined positions relative to said controlled device and to each other, and a nut mounted on said bolt and threadedly secured against said arm having said second opening therein for moving said latter arm so as to progressively close said slit adjacent said first opening and thereby secure said lever on said shaft.

3. A control system comprising a housing, a plurality of openings formed in said housing, a controlled device mounted in said housing, a shaft extending from said controlled device and through one of said plurality of openings, at least one index tang extending from said controlled device and into another of said plurality of openings for locating said controlled device in said housing, a boss formed on an outside surface of said housing, a lever, first opening means intermediate the ends of said lever for mounting said lever on said shaft, parallel-sided passage means extending between said first opening means and one end of said lever, second opening means intermediate said first opening means and said one end of said lever, first threaded means for extending through said second opening means and abutting against said boss to locate said lever relative to said housing, and second threaded means threadedly connected to said first threaded means for securing said lever on said shaft by narrowing said parallel-sided passage means.

4. The control system described in claim 3, and wall means secured to said housing and surrounding said lever with said boss forming one wall thereof.

5. A control system comprising a housing, a plurality of openings formed in said housing, a potentiometer mounted in said housing, a shaft extending from said potentiometer and through one of said plurality of openings, at least one index tang extending from said potentiometer and into another of said plurality of openings for locating said potentiometer in said housing, extended wall means mounted in said housing, a boss formed on a side of said extended wall means, a lever having an aperture adjacent one end and a longitudinal slot extending from said aperture to said one end, said shaft extending through said aperture, said lever being within said wall means, and bolt and nut means mounted on an end portion of said lever and adaptable for contacting said boss when said lever is in a predetermined rotary position on said shaft and for simultaneously securing said lever on said shaft when said shaft is in a predetermined rotary position relative to said potentiometer and setting the rotary position of said shaft relative to said boss.

6. The control system described in claim 5, and a second boss formed on an opposite side of said extended wall means, said shaft and lever relationship being able to be set relative to said second boss for housing mounting purposes by reversing the direction of the ends of said lever through said wall means.

7. In a control system, a support, a control device having a shaft rotatably mounted on said support for rotation about an axis, a stop member on said support adjacent said shaft, a lever having a portion having an aperture extending axially through said lever portion and fitting on said shaft and a slot extending axially through said lever portion and transversely from said lever to provide in said lever portion two spaced parts which are clampable for securing said lever portion on said shaft and clamping means including only a single screw member radially spaced from said axis extending transversely of said spaced apart and securing means securing said screw member to both said spaced parts for clamping said spaced parts together to adjustably clamp said lever portion on said shaft in any selected one of a plurality of rotary adjustment positions relative to said shaft with said screw member adjustably positioned in any one of a plurality of transverse positions relative to said lever and engaging said stop member to limit rotary movement of said lever in a selected one of a plurality of adjustment positions.

8. In a control system, a support, a control device having a shaft rotatably mounted on said support for rotation about an axis, a stop member on said support adjacent said shaft, a lever having a portion having an aperture extending axially through said lever portion and fitting on said shaft and a slot extending axially through said lever portion and transversely from said lever to provide in said lever portion two spaced parts which are clampable for securing said lever portion on said shaft and single screw and nut means including only a single screw member and a single nut member radially spaced from said axis extending transversely of said spaced parts and said members clamping said spaced parts together to adjustably clamp said lever portion on said shaft in any selected one of a plurality of rotary adjustment positions relative to said shaft with said screw member adjustably positioned in any one of a plurality of transverse positions relative to said lever and engaging said stop member to limit rotary movement of said lever in a selected one of a plurality of adjustment positions.

References Cited

UNITED STATES PATENTS

| 2,177,126 | 10/1939 | Arisman | 74—511 |
| 2,334,419 | 11/1943 | Landerholm | 74—526 |
| 2,358,597 | 9/1944 | Russell | 74—526 |
| 2,548,994 | 4/1951 | Miller et al. | 74—504 X |

FOREIGN PATENTS

| 1,014,614 | 8/1957 | Germany | 74—526 |
| 946,364 | 1/1964 | Great Britain | 74—526 |

WILLIAM F. O'DEA, Primary Examiner

T. R. HAMPSHIRE, Assistant Examiner

U.S. Cl. X.R.

74—511; 287—52.02